Sept. 6, 1927.
J. H. HUNT
1,641,386
BATTERY CHARGING SYSTEM
Filed Aug. 3, 1925
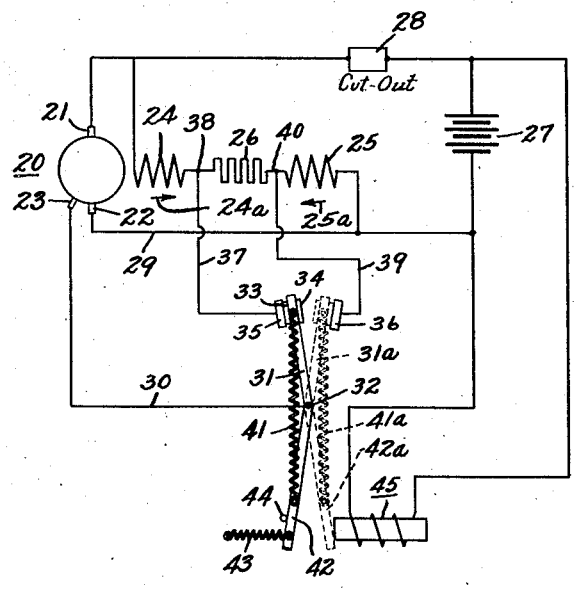
Inventor
John H. Hunt
By Spencer Sendle & Hardman
his Attorneys Patented Sept. 6, 1927.

1,641,386

UNITED STATES PATENT OFFICE.

JOHN H. HUNT, OF DAYTON, OHIO, ASSIGNOR TO GENERAL MOTORS RESEARCH CORPORATION, OF DAYTON, OHIO, A CORPORATION OF DELAWARE.

BATTERY-CHARGING SYSTEM.

Application filed August 3, 1925. Serial No. 47,728.

This invention relates to battery charging apparatus comprising a generator driven at variable speed for charging a storage battery.

The object of the invention is to maintain the battery at a high state of charge while preventing destruction of the battery. This object is accomplished by providing a regulating means which permits the battery to be charged at a relatively rapid rate when the state of charge is low and then by rapidly reducing the charging rate to a lower value when the state of battery charge exceeds a certain amount.

Further objects and advantages of the present invention will be apparent from the following description, reference being had to the accompanying drawings, wherein a preferred form of embodiment of the present invention is clearly shown.

The figure of the drawing is a wiring diagram illustrating a form of the present invention.

In the drawings, 20 designates a generator which is provided with main brushes 21 and 22 and an auxiliary or third brush 23. The generator is provided with opposed shunt fields 24 and 25 which are connected in series with a resistance 26. Arrows 24$^a$ and 25$^2$ indicate the differential relation between these field windings. The main brush 21 is connected with one terminal of a storage battery 27 by a cutout 28 and the brush 22 is connected with the other terminal of the battery with wire 29. The cutout automatically connects the generator with the battery when the generator voltage exceeds a certain value and disconnects the battery when the generator voltage falls below a certain value.

A wire 30 connects the third brush 23 with a switch contact lever 31 which is pivoted at 32 and which is provided with contacts 33 and 34 engageable respectively with contacts 35 and 36. Contact 35 is connected by wire 37 with a wire 38 which connects the resistance 26 with a field winding 24. The contact 36 is connected by wire 39 with a wire 40 which connects the resistance 26 with the field winding 25. The lever 31 occupies either the position shown in full lines in the drawing or the position 31$^a$ indicated in broken lines. When the state of battery charge is below a certain amount the lever 31 is maintained in position by mechanism including a spring 41 which connects lever 31 with a lever 42 which is pivoted at 32. Lever 42 is maintained by a spring 43 against the stop 44. Thus the center line of the spring 41 is maintained at the left of the pivot 32 so that the contacts 33 and 35 will be maintained in engagement. The third brush 23 is located so that as the speed of the generator 20 increases the voltage between the brushes 23 and 21 will decrease. Hence the field excitation produced by the field winding 24 will decrease and the generator will be regulated in the usual manner of third brush regulation. Upon this regulation there is superposed regulation produced by the opposed field 25 which is connected between the main brush 22 and the auxiliary brush 23. When the circuits are arranged as shown in the full line position of lever 31, the resistance 26 maintains the opposing effect of the field 25 at a relatively low value so that the battery 27 will be charged relatively rapidly when its state of charge is below a certain amount.

When the battery charge exceeds a certain high value an electromagnet 45 responsive to the voltage of the battery will attract the lever 42 into the position 42$^a$ indicated in broken lines. This movement of the lever 42 will cause the spring 41 to move to the position 41$^a$ in which its center line lies to the right of pivot 32. This operation will cause the lever 31 to move to the position 31$^a$, and the contacts 33 and 35 to be separated and the contacts 34 and 36 to be connected. When this occurs the resistance 26 will be placed with the field 24 between the brushes 21 and 23 while the field 25 alone will be between the brushes 22 and 23. In this way the excitation produced by the field 24 will abruptly decrease and the excitation produced by the field 25 will abruptly increase. The battery charging rate will be suddenly reduced to a value which will be safe to maintain over a considerable period without injury to the battery.

While the form of embodiment of the present invention as herein disclosed, constitutes a preferred form, it is to be understood that other forms might be adopted, all coming within the scope of the claims which follow.

What I claim is as follows:

1. An electrical generating system comprising a generator driven at variable speed and having main brushes and a third brush located off the neutral zone of commutation and having connected in shunt with the armature a circuit including in series two opposed field windings with a resistance interposed, and a switch for connecting the third brush with said circuit either between one of the field windings and the resistance or between the other field winding and the resistance.

2. An electrical generating system comprising a generator driven at variable speed and having main brushes and a third brush located off the neutral zone of commutation and having connected in shunt with the armature a circuit including in series two opposed field windings with a resistance interposed, a switch for connecting the third brush with said circuit either between one of the field windings and the resistance or between the other field winding and the resistance, a battery charged by the generator, and means responsive to a certain state of battery charge for operating the switch.

In testimony whereof I hereto affix my signature.

JOHN H. HUNT.